Oct. 4, 1960 — G. T. PARSONS — 2,954,592
RESILIENT GASKET
Filed May 27, 1957
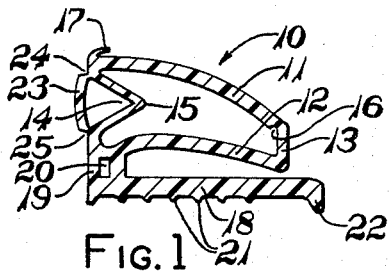
Fig. 1
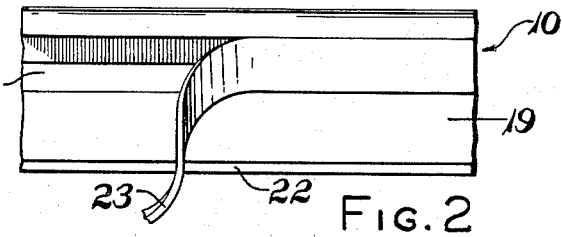
Fig. 2
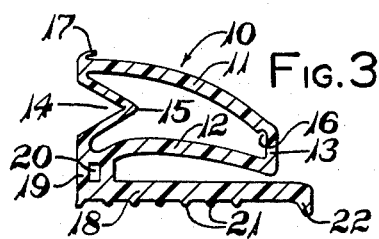
Fig. 3
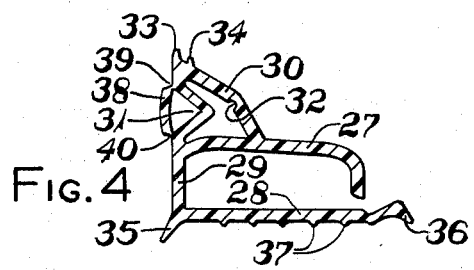
Fig. 4
Fig. 5
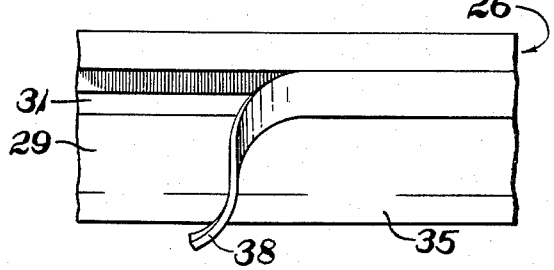
Fig. 6
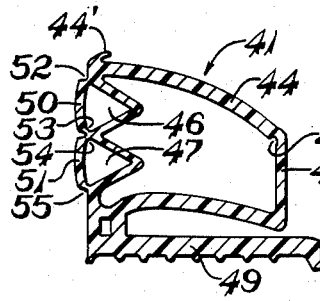
Fig. 7
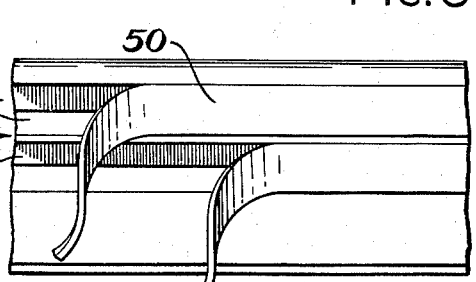
Fig. 8
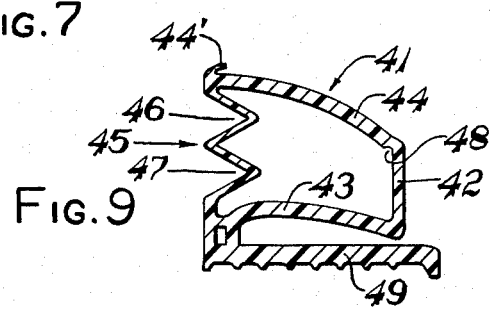
Fig. 9
INVENTOR.
GEORGE T. PARSONS
BY W. A. Shira, Jr.
ATTY.

United States Patent Office 2,954,592
Patented Oct. 4, 1960

2,954,592

RESILIENT GASKET

George T. Parsons, Marietta, Ohio, assignor to The B. F. Goodrich Company, New York, N.Y., a corporation of New York Filed May 27, 1957, Ser. No. 661,887

4 Claims. (Cl. 20—69)

This invention relates to gaskets formed of resilient material and, more particularly, to gaskets used for effecting a compressive seal between two members such, for example, as the cabinet and door of a refrigerator.

Refrigerators, especially those of the type used in the home, employ a gasket or sealing means between the door and the body of the cabinet to cushion the door in closing, prevent the passage of air when the door is closed and provide a heat insulating barrier in this region. These gaskets are generally formed of rubber, synthetic plastic material or other elastomeric materials which have rubber-like properties so they can deform under pressure and thus provide an effective seal between the cabinet and door even though there be irregularities in the surfaces of these two members. Conventional door gaskets are, however, relatively stiff so that considerable pressure is required to deform them sufficiently for effective sealing action around the entire door opening. This, in turn, has made it necessary to utilize door latches which provide a strong clamping force. Since the advent of home refrigerators of larger sizes, there have, in recent years, been numerous incidents of children being suffocated by being locked in the cabinets due to the fact that the doors could not be opened easily from the inside.

In order to insure against this hazard of children being trapped in household type refrigerators, latch release means have been installed on the interior of the cabinets or latching mechanisms have been devised which can be released by a force of light order exerted on the interior of the door. The latter type of latching means also have the advantage of causing less deformation of the door gaskets but unfortunately this has been at the sacrifice of effective sealing action since conventional door gaskets are so stiff that they do not properly conform to surface irregularities when only a light compressive force is applied thereto. Hence, there is now an urgent need for an improved door gasket which can provide an effective compressive type seal between two members under very low sealing pressures. While this need has arisen primarily in conjunction with household type refrigerators it will be apparent that similar problems are present in other apparatus.

One type of gasket which has been devised to meet this need for effective sealing under low compression forces is formed of resilient material shaped as an elongated hollow body with one side wall or face, thereof, provided with a longitudinally extending reentrant wall portion. Gaskets of this type, which are disclosed and claimed in the co-pending application of Howard Naeser, Charles E. Hall and Ardell J. Bergvall, Serial No. 613,780, filed October 3, 1956, are sufficiently rugged when installed in a refrigerator to provide long life effective sealing action. However, because of the thin walls of the gasket and the ready deformability of its hollow body, this type of gasket may be damaged by improper handling and/or storage before installation. This possibility of damage of the gaskets before installation can be reduced by special packaging, suitable supporting forms or other similar expedients. However, such supporting forms or packagings may not be applied to the strips immediately after they are manufactured, or the strips may be prematurely removed from the packages or supports used and the unprotected strips subjected to forces beyond those normally encountered in use and which result in damage to the strips. Hence, special packages and forms have not been entirely satisfactory and, moreover, are generally expensive and bulky.

The principal object of this invention is, therefore, to provide a readily removable reinforcement for a thin-walled hollow body gasket having a transversely collapsible wall portion, the gasket being provided with the reinforcement immediately upon manufacture and remaining in place as a part of the gasket until intentionally removed, whereby accidental displacement of the reinforcement is prevented and the need for special packaging or supports is eliminated.

Another object of this invention is to provide a temporary reinforcement for a gasket which is adapted to effect a soft compression seal between two members by virtue of having a thin-walled hollow body with a reentrant wall portion at one side, the said reinforcement comprising a strip removably attached to the walls of the reentrant portion in a manner which prevents transverse collapse of the said portion.

A further object of the invention is to provide a temporary reinforcement for a resilient hollow bodied gasket as defined in the preceding paragraph wherein the said reinforcement spans the recess provided by the reentrant wall portion and serves as a bracing strut for the walls of the reentrant portion.

A more specific object of the invention is to provide an improved resilient gasket for effecting a soft compression seal between two members, which gasket comprises a thin-walled hollow body formed of rubber-like material with a reentrant wall portion at one side face of the body extending longitudinally thereof with a removable reinforcing strip formed integrally with the body and extending across the recess provided by the reentrant wall portion to strengthen the latter prior to use.

A further object of the invention is to provide an improved gasket of the type defined in the preceding paragraph wherein the said reinforcing strip has longitudinally extending regions of reduced tear strength at the locations of attachment of the strip to the body to facilitate removal of the strip.

An additional object of the invention is to provide an improved gasket of the thin-walled hollow bodied type with a plurality of reentrant wall portions at one side face of the body, each of which is reinforced from the time of manufacture of the gasket by a removable strip attached to the gasket in spanning relationship to the recess provided by a reentrant portion.

Further objects and advantages of the invention will be apparent to those skilled in the art to which it pertains from the following description of certain embodiments thereof described with reference to the accompanying drawing, forming a part of this application, in which:

Fig. 1 is an enlarged transverse sectional view through the presently preferred construction of a sealing means or gasket embodying the invention;

Fig. 2 is a fragmentary front elevational view of the gasket shown in Fig. 1 with the reinforcing strip partially removed from the gasket;

Fig. 3 is a transverse sectional view of the gasket shown in Figs. 1 and 2 with the reinforcing strip removed;

Fig. 4 is an enlarged transverse sectional view similar to Fig. 1 but showing a modified form of a gasket embodying the invention;

Fig. 5 is a fragmentary front elevational view similar to Fig. 2 showing the gasket illustrated in Fig. 4 with the reinforcing strip partially removed;

Fig. 6 is a transverse sectional view similar to Fig. 3 showing the gasket illustrated in Figs. 4 and 5 with the reinforcing strip removed;

Fig. 7 is a transverse sectional view similar to Figs. 1 and 4 but showing another modification of the sealing gasket in which the reinforcing means of this invention is incorporated;

Fig. 8 is a view similar to Figs. 2 and 5 showing the gasket illustrated in Fig. 7 with the reinforcing means partially removed; and Fig. 9 is a view similar to Figs. 3 and 6 showing the gasket of Fig. 7 with the reinforcing strips removed.

Fig. 3 of the drawing illustrates, in transverse section, a gasket of the type disclosed and claimed in the aforementioned copending application of Naeser et al. Such a gasket comprises a thin-walled hollow body 10 formed of resilient elastic material. This material may be natural or synthetic rubber, but, as here shown, the gasket is preferably formed of a flexible and resilient plastic such as plasticized polymerized vinyl resin, for example, polyvinyl chloride. It will be apparent however, that other materials having similar characteristics of flexibility, resiliency, and elasticity may be employed.

The hollow body 10 may be defined as formed of spaced wall portions 11 and 12 which diverge transversely from a region of integral union 13. The opposite edges of the diverging wall portions 11 and 12 are integral with a reentrant portion 14. As here shown, the reentrant portion 14 is V-shaped in cross section with the apex 15 of the reentrant angle disposed inwardly of the body and with the thickness of the reentrant portion being less than the thickness of the wall portions 11 and 12. The hollow body 10 is elongated with the length thereof being sufficient to extend the entire distance of the space which is to be closed. For example, in the case of a refrigerator door gasket, the length of the hollow body is sufficient to extend entirely around the door adjacent the cabinet opening. Preferably, the end portion of the gasket are united together by heat sealing or other means so that the hollow space of the hollow body 10 is continuous.

The hollow body 10 of such a gasket is easily compressed or deformed by light pressure due to the hinging action of the reentrant portion 14 which acts in the nature of a bellows and this compressing or deforming is preferably facilitated by the provision of a region of hinging or bending in a side wall of the body. Thus, at a location spaced from the reentrant portion 14, a longitudinally extending groove or region of lesser thickness 16 is provided adjacent the region where the wall member 11 joins the portion 13 so that the wall portion 11 acts like a lever with the region of the wall at the groove 16 being the pivot. Additional accommodation to surfaces having irregularities is provided by a protruding lip portion 17 provided on the outer surface of the wall portion 11 at the region of the reentrant portion 14. This protuberance or lip is of thin cross section and preferably is angularly directed to extend toward the portion 13 in spaced relation to the hollow body 10 so that the lip 17 can be contacted by and effect at least partial sealing with a member, such as a refrigerator cabinet, before the hollow body 10 is subjected to compression.

A sealing gasket comprising the hollow body 10 with reentrant side wall 14, as just described, can be employed between two members by securing the body to one of the members in any desired manner. This could, for example, be accomplished by forming the wall portion 12 of the hollow body, which is strip-like, in a manner such that it could be cemented or otherwise adhered to one of the members with which the gasket is employed. As here shown, however, the hollow body 10 is formed with an integral attaching portion 18 that is a strip-like part extending longitudinally in substantial alignment with the hollow body 10 and attached thereto by a connecting portion 19 united with the wall or strip-like portion 12 of the hollow body adjacent the reentrant portion 14. In order that this connecting portion 19 of the body may be sufficiently strong to prevent damage its cross section is relatively massive but excessive weight and unnecessary material may be eliminated by providing a hollow center or core 20 extending therethrough.

The strip-like portion 18 is formed in a configuration of the type customarily employed for the structure with which the gasket is to be used and, hence, will vary from one type of installation to another. For example, it is desirable for a sealing gasket in one popular form of refrigerator door to have the lower surface of this strip-like portion 18 provided with longitudinally extending ribs 21 and to have the inner edge 22 of the strip provided with a leg portion extending at substantial right angles to the inner surface of the strip. These features may be varied as dictated by the requirements of a particular refrigerator or other structure in which the gasket is used.

The sealing strip illustrated in Figs. 1 to 3 is intended to be used with a household type refrigerator by having the strip-like portion 18 of the gasket affixed to the door of the refrigerator. This may be accomplished by any well-known means, as for example, by placing a securing member between the hollow body 10 and the strip-like portion 18 with attaching screws, or the like, passing through the attaching member and strip. When thus installed, the hollow body 10 is positioned between the door and cabinet so that when the door is brought to a closed position, compressive force is applied thereto which causes the hollow body to decrease its thickness through partial collapse of the bellows-like portion 14, this being facilitated by the hinging provided by the groove 16, any slight irregularities in the cooperating surfaces of the door or cabinet being compensated for by the lip or protuberance 17 on the outer surface of the hollow body.

The construction is such that the material of the gasket is not itself deformed during normal use but readily returns to an expanded form similar to that shown in Fig. 3 when the door is open. However, the gasket can be damaged if subjected to heavy weights or large compressive forces for long periods of time prior to its installation as might happen if heavy objects are placed thereon or if it should be mishandled in other ways. In order to lessen the possibility of such injury a gasket having the construction just described, is provided with a reinforcement which strengthens the reentrant wall portion and hence, the hollow body 10, prior to placing the gasket in service. This reinforcement is provided in the form of a longitudinally extending strip-like portion or member 23 which spans the reentrant wall portion 14 and is attached to the walls of the gasket in a manner which enables the strip 23 to serve as a reinforcing strut prior to its removal. This strip is so attached, however, that removal thereof can be readily effected without injury to the gasket and without the need of special tools. Thus, in the preferred embodiment, the reinforcing strip 23 is integrally formed with the hollow body 10 by extruding the body and strip in one piece through a suitable die with the regions of the attachment of the strip to the body being of lesser tear strength than the main portion of the strip, as for example, by making these regions 24 and 25 of reduced thickness. By this construction, the reinforcement for the gasket is provided concomitantly with the formation of the gasket so that the latter is protected from excessive deformation from the instant of its manufacture and the reinforcing strip can not be accidentally displaced so that the gasket is supported until the reinforcement is positively removed. Moreover, the reinforcement is such that its application does not require a separate operation, and it is not bulky nor expensive since the amount of material employed therein is of small order.

The user of the gasket with the attached reinforcement strip, as shown in Fig. 1, may readily remove that strip just prior to installing the gasket by grasping the strip and pulling while holding the gasket stationary. The strip will then part from the gasket by tearing along the weakened portions 24 and 25 in the manner which is familiar to those acquainted with tear strips, in other constructions, the operation being illustrated in Fig. 2. When the strip 23 is removed, the gasket is then ready for use and appears in cross section as indicated in Fig. 3. Alternatively, the gasket may be installed with the reinforcing strip in place and allowed to remain therein until the refrigerator is to be placed in service at which time the reinforcing strip 23 may be removed, or if a firmer gasket is desired than that which is afforded by the construction illustrated in Fig. 3, the strip may be allowed to remain in place.

The principles of this invention may be applied to gaskets or sealing strips having configurations somewhat different from that shown in Figs. 1 to 3 in order to adapt the gaskets to the conditions of a particular installation. For example, the gasket shown in Fig. 6 comprises a hollow body 26 one side of which is provided by a part of a strip portion 27 that is united to the attaching strip portion 28 of the gasket by a short wall portion 29. As here indicated, the strip-like portion 27 has its free end disposed arcuately towards the strip-like portion 28 and the wall 29 has dimensions such that a hollow region is formed between the strip portions 27 and 28 to accommodate an attaching plate or member and the heads of screws or other attaching means as is well known in the art.

The hollow body 26 further comprises an angularly extending wall portion 30 which has one edge attached to the strip 27, intermediate the side edges of the latter, and its other edge attached to a reentrant or bellows portion 31. As in the preferred construction, the thickness of the material in the reentrant portion 31 is preferably less than in the wall portion 30 and strip-like portion 27 so that the hollow body 26 can be easily collapsed or compressed by the application of light pressure. To facilitate this action, the wall portion 30 preferably has a hinging region provided by a longitudinally extending groove 32 or region of reduced thickness at a location spaced from the reentrant portion 31 as will be readily apparent from an inspection of Fig. 6. To further facilitate the action of the reentrant portion and ensure sealing action of the gasket with the surface of the member with which the gasket engages, even though that surface is somewhat irregular, the hollow body 26 is shown as provided along its apex or outermost edge with sealing lips or projections, 33 and 34. The attaching strip portion 28 of the hollow body may have suitable projections, such as the leg portions 35 and 36, and intermediate ribs, such as 37, to facilitate reception and proper attachment to the refrigerator door or other member with which the gasket is united, these features being provided and shaped in accordance with the nature of the installation in which the gasket is employed.

A gasket of the type shown in Fig. 6 has the reentrant wall portion 31, and hence the hollow body 26, reinforced by a strip portion 38 extending longitudinally of the reentrant portion and attached to the body so as to span the recess provided by the reentrant portion. As shown in Fig. 4, this reinforcing strip 38 is similar in nature to that indicated for the gasket illustrated in Fig. 1. That is, the strip 38 is formed integrally with the hollow body 26 and has regions 39 and 40 of reduced tear strength where the strip is united with the gasket proper. This reinforcing or tear strip 38 provides protection for the gasket and functions in the same manner as has been described with respect to Figs. 1 and 2, the strip being readily removable from the gasket as indicated in Fig. 5.

In some installations it is desirable that the gasket or sealing member have a thickness greater than that which can be properly achieved with a single angle reentrant portion of the type indicated in Figs. 3 and 6. In such instances, the principles of this invention can be employed by forming the gasket with more than one reentrant angle. Thus, as indicated in Fig. 9, the hollow body 41 is formed by an inner side wall 42 from which walls 43 and 44 transversely diverge in spaced superposed relationship with the opposite edges of the latter being united by a double reentrant or bellows portion 45. The reentrant portion 45 has two reentrant angles 46 and 47 so that this wall of the gasket is substantially W-shaped in cross section. Preferably, the thickness of the material comprising the reentrant wall portion 45 is less than that of the wall portions 42, 43 and 44 to ensure that deformation of the gasket under sealing pressure is effected by decrease of the reentrant angles 46 and 47. To further facilitate this functioning, the hollow body 41 is preferably provided with a region of hinging action spaced from the reentrant portion 45, for example, by providing a longitudinally extending groove or recess 48 in the region where the wall portions 42 and 44 merge. The hollow body 41 can be attached to the refrigerator door or other member with which it is employed by any suitable means as, for example, by forming the body with an attaching strip portion 49 similar to, and functioning in the same manner as, the strip portion 18 of Fig. 1. Also, the outer edge of the hollow body 41, in the region of the reentrant portion 45, preferably has a flexible lip portion or protuberance 44' similar to the portion 17 of Fig. 1.

The gasket shown in Fig. 8 may, in accordance with this invention, have the reentrant portion 45, and hence the hollow body 41, reinforced by a removable strip member united to the body and spanning the reentrant portion 45. In the form shown in the drawing, see Figs. 7 and 8, the reinforcement comprises two tear strips 50 and 51 formed integrally with the hollow body 41 and attached to the walls of the latter by regions of reduced tear strength 52, 53, 54 and 55. Hence, the hollow body of the gasket may be supported and prevented from damage by the strut-like action provided by the strips 50 and 51 in a manner which will be apparent from the above description with respect to similar reinforcement provided by the tear strips 23 and 38. The strips 50 and 51 may readily be removed from the body by a tearing action as will now be understood and as is indicated in Fig. 8.

The reinforcing strips here illustrated and described for the several forms of gaskets have all been shown as attached at the entrance to the recess provided by the reentrant wall portion. It will be apparent, however, that this is not a necessary location for the reinforcing strip since it may be provided inwardly of the outer edges of the reentrant portion in some cases. Moreover, it is not essential to the practice of the invention that the reinforcing strips have regions of reduced tear strength adjacent to regions of connection to the walls of the gasket since the reinforcing strips may be removed by knives, electrically heated wires applied thereagainst, or by other well-known expedients. It will also be apparent that the principles of this invention can be incorporated in sealing gaskets of somewhat different configurations from those here specifically shown and described. Therefore, the invention is not to be considered as limited to the precise details of construction herein set forth except as may be required by the spirit and scope of the subjoined claims.

Having thus described the invention, I claim:

1. A resilient gasket comprising an extrusion of flexible rubber-like material for effecting a soft compression seal between two members adjacent the periphery of at least one of the members, the said gasket comprising a strip portion adapted to be attached to one of the members, a second strip portion extending in spaced superposed relationship to the first strip portion with the said portions integrally united along one longitudinal edge of the portions, and an elongated hollow deformable body on the outer surface of said second strip portion with the said second strip portion forming one wall of said body, the said hollow body including a second wall portion integrally united with said second strip portion in a region spaced from the union of said first and second strip portions with the second wall portion extending toward said union of the strip portions in spaced diverging relationship to the said second strip portion and with the outer edge of said second wall substantially aligned with the edge of the union of the strip portions, the said second wall portion being adapted to be engaged by the other of the members between which the gasket is placed, a reentrant wall portion uniting the said outer edge of the second wall portion to the second strip portion in the region of the union of the strip portions with the reentrant wall portion having a region of flexure extending longitudinally thereof intermediate its unions with the said second strip portion and the said second wall portion, and strip like reinforcing means of the same material as the said strip and wall portions extending across the recess provided by the reentrant wall portion and removably intergrally attached to said second strip portion and said second wall portion to strengthen the said reentrant wall of said hollow body prior to use of the gasket.

2. A resilient gasket as defined in claim 1 wherein the said strip-like reinforcing means has longitudinally extending regions of reduced tear strength at the locations of attachment to said second strip and second wall portions whereby the said reinforcing means may be readily removed from the body.

3. A resilient gasket as defined in claim 1 wherein the said reentrant wall portion is substatially W-shape in cross section providing a plurality of regions of flexure extending longitudinally of the reentrant wall portion and the said strip like reinforcing means is removably integrally attached to the longitudinally extending central apex of the reentrant wall portion.

4. A resilient gasket comprising an extrusion of rubberlike material for effecting a soft compression seal between two members adjacent the periphery of at least one of the members, the said gasket comprising a strip portion adapted to be attached to one of the members, a second strip portion extending in spaced superposed relationship to the first strip portion with the said portions united along one longitudinal edge of the portions, and an elongated hollow deformable body on the outer surface of said second strip portion with a part of said second strip portion forming one wall of said body, the said hollow body including a second wall portion integrally united with said second strip portion in a region intermediate the side edges of the latter with said second wall portion extending toward said union of the strip portions in spaced diverging relationship to said second strip portion and with the outer edge of said second wall portion substantially aligned with the edge of the union of the strip portions, the said second wall portion being adapted to be engaged by the other of the members between which the gasket is placed, a reentrant wall portion uniting the said outer edge of the second wall portion to said second strip portion in the region of the union of the strip portions with the said reentrant wall portion having a region of flexure extending longitudinally thereof intermediate its unions with the said second strip portion and the said second wall portion, and a reinforcing strip of the same material as the said strip and wall portions integrally attached to said second strip and second wall portions in spanning relationship to said reentrant wall portion with the said reinforcing strip having longitudinally extending regions of reduced thickness at its locations of attachment so that the reinforcing strip may be readily removed.

References Cited in the file of this patent

UNITED STATES PATENTS

| 984,232 | Monroe | Feb. 14, 1911 |
| 2,263,806 | Hammerl | Nov. 25, 1941 |
| 2,263,831 | Welch | Nov. 25, 1941 |
| 2,659,118 | Anderson et al. | Nov. 17, 1953 |
| 2,736,076 | Bush et al. | Feb. 28, 1956 |
| 2,823,430 | Morton | Feb. 18, 1958 |